Patented Feb. 9, 1932

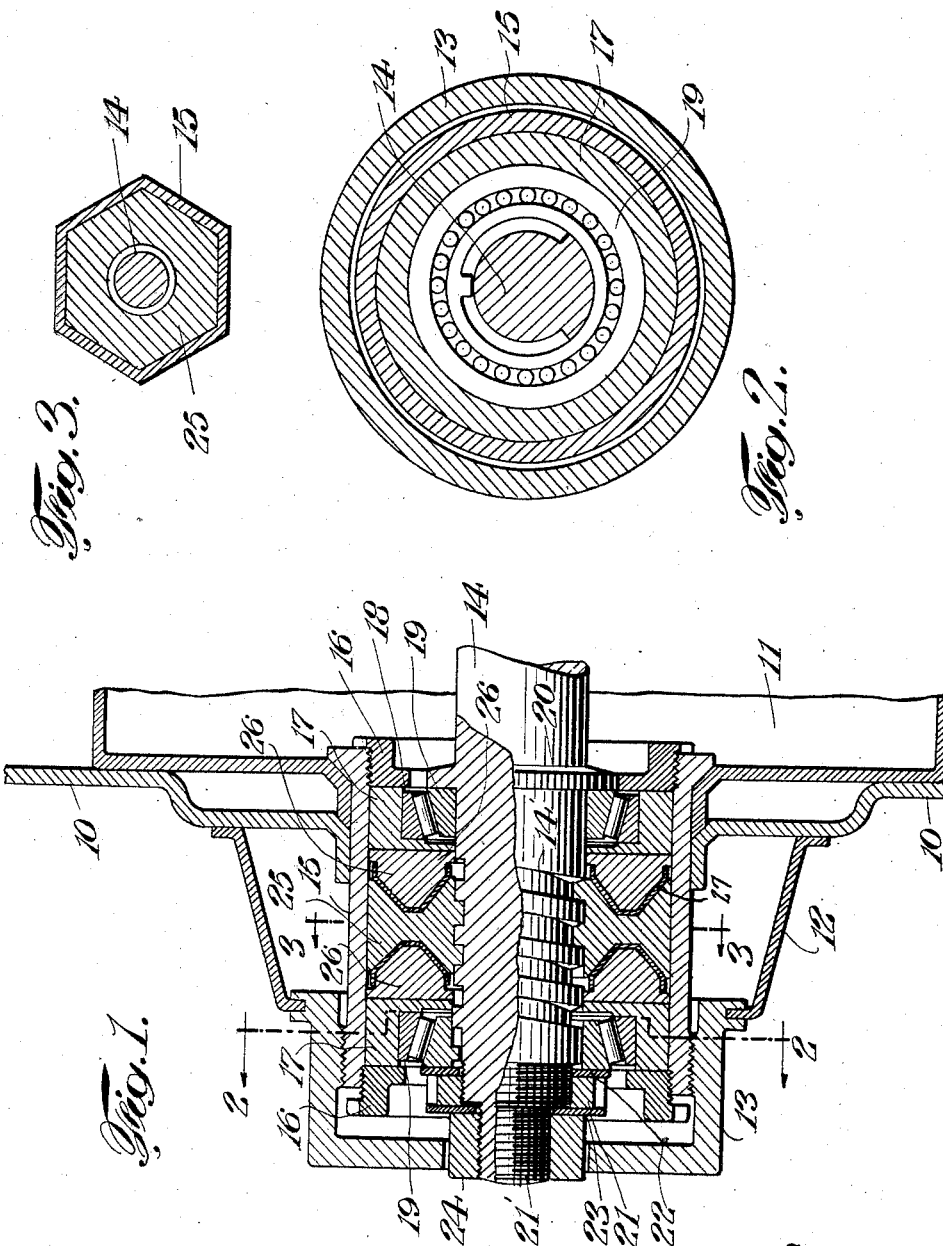

1,844,836

UNITED STATES PATENT OFFICE

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK

FLEXIBLE DRIVING MECHANISM

Application filed January 18, 1928. Serial No. 247,479.

My invention relates to improvements in flexible driving mechanism and is applicable generally to all classes of mechanical structures where a rotary driving element imparts movement to a driven element.

The general object of the invention is to counteract the transmittal effects of mechanical shock and shearing strains to which the majority of driving and driven elements are subjected when in action. It is applicable, for example, to all kinds of driving shafts, wheels or pulleys. It is particularly applicable to the wheels and axles of motor driven vehicles and it is adapted in such uses to provide a resilient element through which the driving strain is transmitted and which is disposed between the axle and wheel hub.

My invention is further intended to produce a flexible or resilient driving connection between the shaft or axle and the wheel hub which will operate equally well whether the shaft or axle is turning either what is known as forward or reverse direction. In either case the element, intended to absorb the shocks and strains particularly in starting in either direction, is disposed so that it acts as a resilient clutch permitting the strain to be applied gradually, and in connection with this driving means, and as a part of it, I preferably employ differential bearings which facilitate the operation of the driving mechanism. There are many ways in which my invention can be carried into effect, but I have shown a simple and preferred means in which when the driving shaft or axle is turned in either direction it moves a clamping or compressing element, first against a resilient or shock absorbing member, and then drives positively through the hub and wheel. This will be better understood from the description which follows.

Reference is to be had to the accompanying drawings in which similar reference characters represent the corresponding parts in all views.

Figure 1 is a broken longitudinal section of a vehicle axle and wheel hub showing my improved driving mechanism.

Figure 2 is a cross section on the line 2—2 of Figure 1, and

Figure 3 is a cross section on the line 3—3 of Figure 1 on a reduced scale.

In the drawings I have shown the application of my invention to a driving axle and wheel of a motor vehicle, and some of the parts are substantially conventional, for example, the wheel 10 may be of any usual or preferred kind, and to avoid confusion, I have shown the customary brake drum 11, the hub guard 12, and the cap 13, these parts being all substantially conventional and obviously other parts can be substituted for them. The axle 14 which can represent any driving shaft, but which in the case of a motor vehicle is an axle, has a short, strongly and coarsely threaded part 14' within the wheel hub 15 in which the axle enters as usual and the hub is preferably, and at least on its inner side, of facetted or multi-sided construction. It can be connected with the wheel in any conventional or preferred way. Entering the hub at opposite ends are nuts 16 which hold in place the flanged abutments 17 which fill the space between the axle and hub near the hub ends being recessed at their outer sides and inner portions as shown at 18 to receive differential bearings 19. The bearings should be ball bearing, roller bearings or other analogous easy running bearings, as they facilitate the slight differential movement necessary when the driving mechanism is starting in either direction. The inner bearing 19 abuts with a collar 20 on the axle or shaft 14, and the outer bearing is held in place by a nut 21. Washers 22 and 23 can be used if desired on both sides of the nut, and the nut engages a threaded part 21' near the outer end of the axle, which is provided with the customary security nut 24.

Fitting within the hub 15 and preferably near the middle part thereof, is a driving element 25 which is in the nature of a clutch member, and which has a slight sliding movement in the hub and also turns with it. This element or member 25 engages the coarse screw 14' of the shaft or axle 14 and when moved in either direction, it is forced against one of the resilient elements 26 which are shown in Figure 1 on each side of the member 25 and in abutment with the abutments 17 already referred to. If desired, the blocks 26 can be provided with protective caps 27 on the sides next the member 25.

The blocks 26 can be composed of ordinary fabric, rubberized fabric, rubber, or any other suitable material.

It will be seen that when the shaft or axle 14 is turned in one direction, the member 25 actuated by the thread 14' of the axle 14 will be moved and as it cannot first rotate because of its multi-sided connection with the hub, it will move endwise and compress one of the blocks 26 against the abutment 27, and thus gradually lock the axle, the member 25, the block 26, the abutment 27 and the hub 15 in driving connection, and after this the drive will be positive, but the shock of starting will be relieved and any slight differential movement in the hub parts will be relieved by the bearings 19. If now the parts are turned in the opposite direction, the effect will be exactly the same, only the member 25 will slide in the opposite direction and lock through the second drive block 26. Thus it will be seen that the driving element or shaft 14 when starting in either direction effects a positive driving of the driven element, but that the strain is applied in a resilient manner which absorbs the otherwise severe shock. It will be noted that the construction which I have shown and described acts as an automatic clutch between the driving and driven elements, acting first resiliently and then positively when the driving element is turned in either direction.

From the foregoing description, it will be evident to a mechanic that this effect to wit: the flexible connection between the driving and driven elements might be obtained by varying the structure greatly and my invention is not therefore limited to the means shown for effecting the drive although I believe this particular structure is in itself novel.

I claim:

1. A flexible driving mechanism, comprising a rotary driving member, a rotary multi-sided driven member mounted on and spaced from the driving member, spaced abutments between the two elements, a multi-sided clutch member held to turn with and slide in the driven member, a screw threaded connection between the clutch member and the driving element and resilient members between the clutch member and the aforesaid abutments.

2. A flexible driving mechanism, comprising a rotary driving element, a rotary multi-sided driven element mounted on and spaced from the driving element, spaced abutments between the driving and driven elements, bearings disposed between the two elements outside the abutments, a multi-sided clutch member held to turn with and slide in the driven element, said clutch member being disposed between the abutments and threaded to the driving element, and resilient members between the clutch member and the abutments.

3. A flexible driving mechanism comprising a rotary driving shaft, a rotary driven element mounted on and spaced from said shaft, said driven element comprising a multi-sided collar surrounding said shaft, a multi-sided clutch element fitting closely and slidably within said collar, said clutch being mounted on said shaft in screw-threaded engagement therewith, an abutment rigidly fixed on each end of said collar, and a resilient element between each abutment and the clutch.

4. A flexible driving mechanism comprising a rotary driving shaft, a rotary driven element mounted on and spaced from said shaft, said driven element comprising a multi-sided collar surrounding and spaced from said shaft, a multi-sided clutch element fitting closely within and in longitudinally slidable relation with said collar, said clutch being mounted on said shaft, means between said shaft and clutch to impart longitudinal and rotary movements to said clutch, abutments rigidly fixed on each end of said collar, and a resilient element between each abutment and the clutch.

5. In an apparatus of the class described in combination, a drive shaft, a wheel hub surrounding and spaced from said drive shaft, a resilient body disposed between said shaft and hub, said body having circumferentially arranged gripping surfaces, surfaces upon said hub complementary to said gripping surfaces, and a clutch mounted upon said drive shaft, and longitudinally movable thereon to engage said resilient element, and force same into gripping engagement with said hub.

6. An apparatus of the kind described comprising a driving shaft, a hub spaced apart from the aforesaid driving shaft, spaced abutments between the hub and shaft, a clutch member having a screw connection with the driving shaft and driving connections with the hub, resilient members between the clutch and the aforesaid abutments, said members being disposed to have a driving connection with the hub whereby the movement of the clutch in either direction compresses one of said resilient members and imparts a driving connection between the driving shaft and hub through the said compressed resilient member and also through the clutch.

In testimony whereof, I have signed my name to this specification this 14th day of January, 1928.

FREDERICK WILLIAM BAKER.